United States Patent [19]

Mineyama et al.

[11] 4,262,036

[45] Apr. 14, 1981

[54] METHOD AND APPARATUS FOR COATING VISCOUS MATERIAL

[75] Inventors: Hideki Mineyama, Chigasaki; Shinzo Takei, Tokyo, both of Japan

[73] Assignee: Sony Corporation, Tokyo, Japan

[21] Appl. No.: 24,207

[22] Filed: Mar. 27, 1979

[30] Foreign Application Priority Data

Apr. 20, 1978 [JP] Japan .................................. 53-46935

[51] Int. Cl.[3] ........................ C03C 17/00; C03C 17/04

[52] U.S. Cl. ........................................ 427/64; 118/315; 118/316; 118/323; 118/500; 118/663; 427/279; 427/284; 427/286

[58] Field of Search ................. 427/64, 286, 284, 279; 118/323, 663, 315, 316, 500

[56] References Cited

U.S. PATENT DOCUMENTS 4,137,341 1/1979 Adachi .................................. 427/64

*Primary Examiner*—John D. Smith

*Attorney, Agent, or Firm*—Lewis H. Eslinger; Alvin Sinderbrand

[57] ABSTRACT

A pair of horizontally disposed nozzles above a horizontally disposed seal edge surface for coating a frit slurry in a closed pattern on the surface are moved in opposite directions from an abutting, mutually blocking position until the nozzles again come into sealing abutment at a second point above the surface. During the travel of the nozzles, a frit slurry is discharged therefrom at a constant rate and is deposited in a uniform stripe on the seal edge surface. Just before the nozzles abut at the end of the coating operation, the flow of frit slurry from one of them is terminated. This permits the frit slurry from the second nozzle to make a tapered overlay of the frit slurry from the earlier cut off nozzle without forming a bump or extra width at the joint. A rectangular gear generally conforming to the shape of the seal edge surface to be coated is employed to drive the nozzles at a substantially linear speed along the seal edge surface.

27 Claims, 15 Drawing Figures

METHOD AND APPARATUS FOR COATING VISCOUS MATERIAL

BACKGROUND OF THE INVENTION

The present invention relates generally to apparatus for coating a stripe of viscous material on a sealing surface.

Glass-to-glass seals, particularly useful in assembling various types of display tubes such as, for example, in assembling a glass face plate of a cathode ray tube to a funnel-shaped rear portion, are made by laying down a stripe of frit slurry containing low temperature melting glass particles in a binder in a closed pattern on a sealing surface of one of the two members to be sealed, placing the other member to be sealed against the coated sealing surface and heating the assembly to a temperature which causes the frit slurry to fuse and thereby to unite the two parts to be joined.

According to the prior art, a funnel portion of a cathode ray tube is positioned facing upward with its seal edge surface horizontally disposed. The funnel portion is rotated at a constant angular velocity and a nozzle is guided to remain aligned over the seal edge surface while a frit slurry is deposited from the nozzle on the seal edge surface to form a frit coating stripe. As is well known, the frit slurry used is quite viscous, having a viscosity suitably between about 5000 and about 20,000 centipoises and, in addition, is thixatropic. The binder of the frit slurry is also volatile. Deposition of the frit coating stripe may begin at an arbitrary point on the seal edge surface and continue in a closed pattern ending at a point coincident with the beginning. Since the beginning point of the frit coating stripe is coated some time before the nozzle completes its deposition at the end point (coinciding with the start point) the beginning of the frit coating stripe is hardened significantly and does not blend satisfactorily with the end portion of the frit coating stripe. Consequently, the end of the frit coating stripe overlays the beginning portion to create a bump. The extra material in the bump interferes with proper sealing and may be squeezed both outward and inward during the sealing operation. It is common in such sealing operations to employ a skilled manual worker to shape the overlapping portion in order to avoid this problem. The necessity for employing a skilled manual worker in this task prevents automation of the coating process and adds to the cost. Particles of frit slurry removed during the shaping operation can remain inside the tube after sealing and interfere with its operation. In addition, the binder used in frit slurry can be hazardous to the worker's health if he is not protected against it. Consequently, the health safety measures required to protect the skilled manual worker also add to the cost of the sealing operation.

One approach to solving the problem outlined in the preceding is disclosed in U.S. Pat. No. 4,137,341, issued Jan. 30, 1979, and having an assignee in common herewith. In this patent, a pair of nozzles begin a coating operation immediately adjacent to each other and follow opposite paths to end immediately adjacent to each other. This procedure has the advantage that the slurry from both nozzles has the same viscosity at the meeting points at the beginning of coating and also at the end. However, since the outlets of the nozzles are necessarily slightly separated from each other at both the start and end points, the frit slurry from the two nozzles may not always connect smoothly and continously to provide a frit coating stripe having uniform thickness and width. The outlets of the nozzles in this patent face generally in the downward direction. Independent means are thus required for starting and stopping the discharge of the frit slurry at the beginning and end points.

U.S. Pat. No. 3,947,311 shows an apparatus for sealing the edges of double-pane insulating glass sheets. In this patent, two horizontally disposed nozzles inject cement into the interspace between two glass sheets as the glass sheets are carried on the conveyor past the two nozzles. As noted, this patent is directed to sealing of the edges of double-pane insulating glass units and has no more than peripheral significance to the laying down of a continuous stripe of viscous material such as a frit slurry.

OBJECTS AND SUMMARY OF THE INVENTION

It is an object of the present invention to provide a method and apparatus for coating viscous material which avoids the problems f the prior art.

It is an object of the present invention to provide a method and apparatus for coating a stripe of viscous material in a closed pattern and avoiding non-uniformity such as at the point where the pattern is closed.

It is a further object of the present invention to provide a method and apparatus for laying down a stripe of frit slurry in a continuous closed pattern on a horizontal sealing surface wherein two aligned horizontal nozzles begin from a mutually blocking position and travel in opposite directions about the sealing surface until they again meet after having each traveled half of the perimeter of the sealing surface. By starting from a mutually blocking position, the frit slurry emerging from the two nozzles at the beginning of the stripe is united without discontinuity. The two ends of the frit stripe which meet after the nozzles have each traveled half the perimeter of the sealing surface are both fresh and are able to merge with each other. The flow from one of the nozzles is halted just before the two nozzles meet to provide a tapered overlapping joint without excess material.

According to an aspect of the invention, an apparatus is provided for coating a closed pattern of material on a horizontal surface which comprises first and second nozzles having parallel horizontal axes spaced above the horizontal surface, the first and second nozzles respectively having first and second nozzle outlets, means for moving the first and second nozzles in opposite directions along the closed pattern from a first position whereat the first and second nozzle outlets are abuttingly opposed and mutually blocking to a second position whereat the first and second nozzle outlets are mutually opposed, means for supplying a flow of the material to be coated at a constant rate to the first and second nozzles during motion thereof between the first and second positions and terminating means for terminating the flow at the second position.

According to a feature of the invention, the means for moving the first and second nozzles is operative to move the nozzles at a constant speed regardless of the size and shape of the closed pattern.

According to a further feature of the invention, a method of applying a closed pattern of material to a substantially horizontal, upward facing surface comprises the steps of disposing at least first and second nozzles having outlets spaced above a first point on the surface, the outlet of the first nozzle and the outlet of the second nozzle being abuttingly opposed to each other and mutually blocking at the first point, simultaneously moving the first and second nozzles in opposite directions along a path corresponding to the closed pattern with the first and second nozzles starting from the first point and moving to a terminal point and keeping the nozzles aimed in fixed directions relative to the surface, supplying the material to be coated at a constant rate to the first and second nozzles during moving wherefrom the material is deposited in a continuous stripe onto the surface, and substantially simultaneously halting the movement of the first and second nozzles at the terminal point whereat the outlet of at least the first nozzle is abuttingly opposed to and manually blocking an adjacent nozzle outlet whereby the surface is coated with a closed continuous substantially uniform pattern of said material.

The above, and other objects, features and advantages of the present invention will become apparent from the following description read in conjunction with the accompanying drawings in which like numerals designate the same elements.

DETAILED DESCRIPTION OF THE PREFERRED EMBODIMENT

Figure 1:
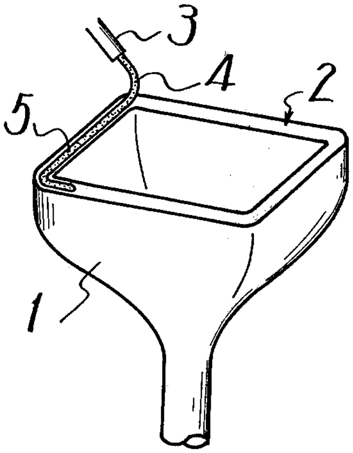
FIG. 1 is a perspective view of a funnel portion of a cathode ray tube to which reference will be made in describing a coating process according to the prior art.
Figure 2:
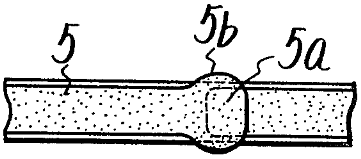
FIG. 2 is a plan view of a section of a seal edge surface of FIG. 1 showing the overlap of an end of a deposited stripe over a beginning of a deposited stripe according to the prior art.
Figure 3:
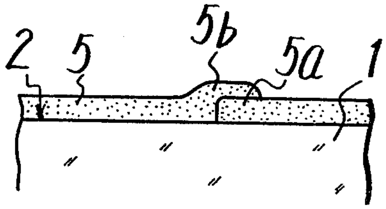
FIG. 3 is a side view of the joint of FIG. 2.

Referring now to FIG. 1, there is shown a method of coating a viscous slurry of frit 4 on a seal edge surface 2 of a funnel portion 1 of a cathode ray tube according to the prior art. A downward-pointing nozzle 3 emits a flow of frit slurry 4 as the funnel portion 1 is rotated to lay down a frit coating stripe 5 in a closed loop upon the seal edge surface 2. During the process of laying down the frit coating stripe 5, the frit slurry 4 at the starting point of the stripe begins to dry and harden slightly due to the thixatropic and volatile nature of the frit slurry 4. As the closed pattern of the frit coating stripe 5 is completed, the end portion 5*b* (FIGS. 2 and 3) overlaps the slightly hardened beginning portion 5*a*. The bump thus formed not only interferes with satisfactorily joining a face plate (not shown) to funnel portion 1 but also provides excess material which extrudes inside and outside the tube during sealing. To avoid this, it is necessary to use skilled manual labor to shape the overlapping portions to remove the excess before fitting the mating part to the funnel portion 1.

In addition, the downward-pointing arrangement of nozzle 3 makes it difficult to properly control the flow of frit at the beginning and end of frit coating stripe 5.

Figure 4:
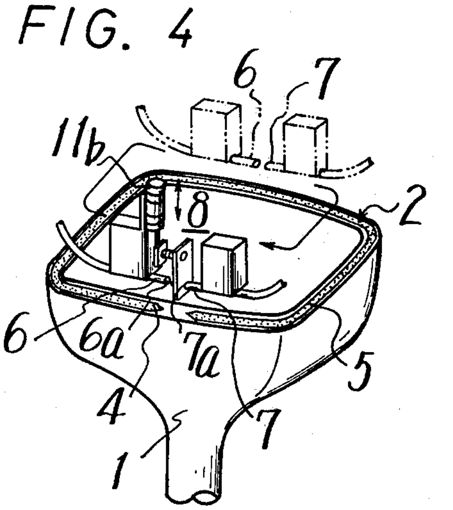
FIG. 4 is a schematic perspective view of an apparatus for coating a closed pattern of material on a seal edge surface of a cathode ray tube according to the present invention.

Referring now to FIG. 4, there is shown a coating apparatus according to an embodiment of the present invention in which first and second nozzles 6 and 7 having parallel horizontal axes are moved in opposite directions from their initial positions shown in dot-dash line along paths indicated by arrows until they again meet at end positions shown in solid line. At their initial positions, nozzle outlet or exhaust ports 6*a* and 7*a* of nozzles 6 and 7 respectively are aligned and mated to effectively seal the frit slurry within them whereby the frit slurry in nozzles 6 and 7 is joined into a single mass without separation between its parts. As nozzles 6 and 7 separate and begin to move apart, a constant-rate pump (not shown in FIG. 4) supplies slurry to nozzles 6 and 7 at a constant flow rate approximately equal to the speed with which nozzles 6 and 7 move along the seal edge surface 2. Consequently, as nozzles 6 and 7 move apart, frit slurry 4 is laid down in a uniform frit coating stripe 5 with no discontinuity at the beginning point.

Figure 5:
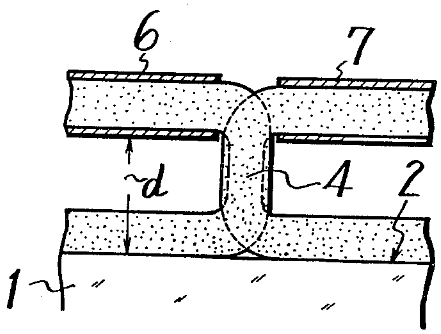
FIG. 5 is a close-up cross-sectional view of nozzles of FIG. 4.
Figure 6:
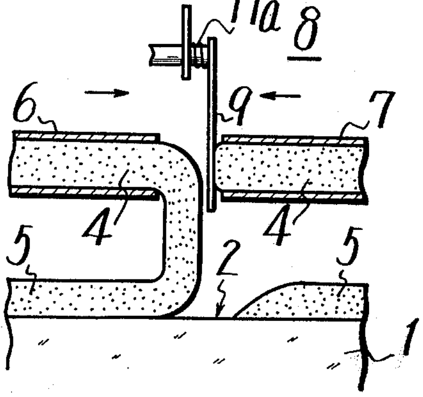
FIG. 6 is a close-up cross-sectional view similar to FIG. 5 in which a shutter mechanism is employed to cut off the flow of material from one of the nozzles.
Figure 7:
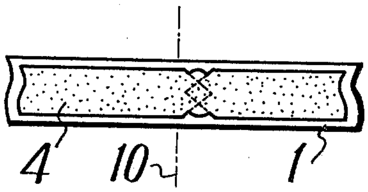
FIG. 7 shows an overlapped joint according to the present invention.

FIG. 5 shows nozzles 6 and 7 just before they come into abutment at the end of the closed pattern. Since nozzles 6 and 7 are necessarily spaced a distance d, suitably about 1 cm, above seal edge surface 2, terminating the flow of frit slurry 4 by abutment between them would undesirably leave an excess of frit slurry 4 at the joint. In order to avoid an interfering bump, the apparatus of FIG. 6 provides a shutter mechanism 8 associated with nozzles 6 and 7 which terminates the flow of frit slurry 4 from nozzle 7 slightly before the nozzles 6 and 7 come together. A cylinder 11*b* is operated in the direction shown by the double-headed arrow in FIG. 4 to move a shutter plate 9 across nozzle outlet 7*a* of nozzle 7. This terminates the flow of frit slurry 4 from nozzle 7 but permits frit slurry 4 to continue to flow from nozzle 6 for a short time. Nozzles 6 and 7 continue to move toward each other as shown by the single-headed arrows in FIG. 6 until they come together on opposite sides of shutter plate 9. A spring 11*a* permits lateral motion of shutter plate 9 in order to permit nozzles 6 and 7 to come together. As nozzles 6 and 7 come together at 10 (FIG. 7), the frit slurry 4 is cut off and is no longer permitted to emerge from nozzle 6. As shown in FIG. 7, the flow termination from nozzles 6 and 7 is timed to form a tapered joint having a thickness approximately equal to the thickness of the body of frit coating stripe 5 and without extra width. The constant rate pump is stopped in coincidence with the termination of the flow of slurry from nozzles 6 and 7.

Upon completion of the coating process just described, nozzles 6 and 7 may be separated and returned to their initial positions shown in dot-dash line in FIG. 4 with their nozzle outlets *6a* and *7a* again meeting and mutually blocking.

Figure 8:
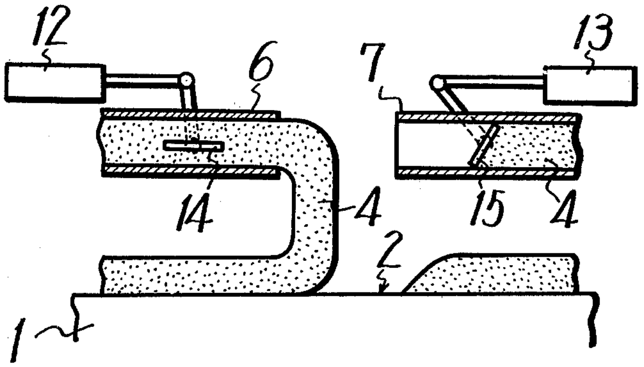
FIG. 8 shows a close-up cross-sectional view of nozzles including another embodiment of a shutter mechanism.

Another shutter mechanism giving separate control of frit slurry flow from nozzles 6 and 7 is shown in FIG. 8. A valve shutter 14 in nozzle 6, controlled by an air cylinder 12 may be employed to block or unblock nozzle 6. A similar valve shutter 15 controlled by an air cylinder 13 may be employed to block or unblock nozzle 7. The condition shown in FIG. 8 wherein valve shutter 15 is closed is approximately the same as the condition shown in FIG. 6 wherein shutter plate 9 is moved over nozzle outlet *7a*. As shown in FIG. 8, the flow of frit slurry from nozzle 7 is stopped by the closing of valve shutter 15 and the flow of frit slurry from nozzle 6 is continued and may be cut off by abutment between the ends of nozzles 6 and 7. After abutment, a slight excess of frit slurry from nozzle 6 may be permitted to flow into and fill the empty end of nozzle 7. This helps reduce the pressure of frit slurry in nozzle 6 and helps prepare nozzles 6 and 7 for the start of the next coating operation.

Figure 9:
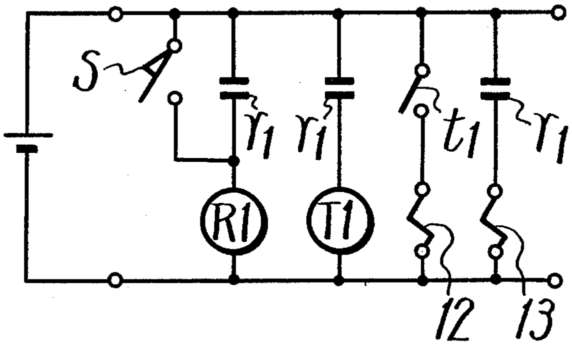
FIG. 9 is a schematic diagram of a control system for controlling the shutter mechanism of FIG. 8.

Referring now to FIG. 9, there is shown a control circuit for controlling the valve shutters of FIG. 8. A normally open switch S has its contacts in series from a power source to a coil $R_1$ of a relay. One normally open contact $r_1$ of the relay is in series with relay coil $R_1$. A second normally open relay contact $r_1$ is in series from a power source to a timer $T_1$. A third normally open contact $r_1$ of the relay is in series from a power source to an actuator of air cylinder 13. A normally open contact $t_1$ of timer $T_1$ is in series from a power source to an actuator of air cylinder 12.

At the point in its travel where the flow of frit slurry from nozzle 7 is to be terminated, switch S is closed. Relay coil $R_1$ is thereby energized and the three sets of normally open relay contacts $r_1$ are closed. Relay contacts $r_1$ associated with relay coil $R_1$, being closed, maintain the power to relay coil $R_1$ even if switch S is then opened. Relay contacts $r_1$ in series with the actuator of air cylinder 13 immediately actuates air cylinder 13 to cut off the flow of frit slurry from nozzle 7. Timer $T_1$, energized through closed relay contacts $r_1$, begins a timing cycle which, upon its completion, closes timer contacts $t_1$ to energize air cylinder 12. Air cylinder 12 thereupon closes valve shutter 14. In the preferred embodiment, air cylinder 12 is actuated just as nozzles 6 and 7 come together. Fine adjustment of the termination joint of the frit coating stripe 5 can be performed by speed control of air cylinders 12 and 13. Thus, frit coating stripe 5 can be terminated without discontinuity in width or thickness.

Figure 11:
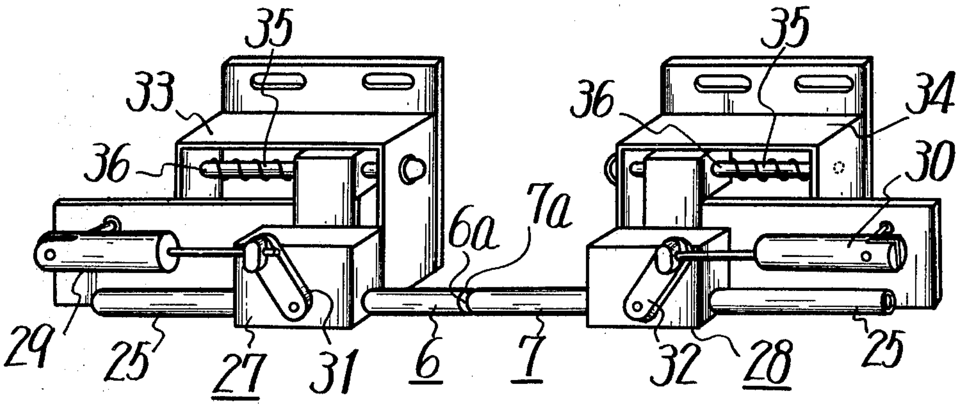
FIG. 11 is a perspective view of an apparatus for holding and controlling nozzles included in the embodiment of FIG. 10.

As shown in FIG. 11, nozzles 6 and 7 are located with their nozzle outlets *6a* and *7a* horizontally opposed to each other. The nozzles 6 and 7 are supported on attaching members 33 and 34 respectively. A shaft in each attaching member 33 and 34 is engaged by a sliding member attached to shutter members 27 and 28 and nozzles 6 and 7. A spring 36 on each shaft 35 biases the shutter members 27 and 28 with their nozzles 6 and 7 respectively toward each other and provides for lost motion when the nozzle outlets *6a* and *7a* come together. Thus, overtravel of attaching members 33 and 34 toward each other results in a spring force biasing nozzles *6a* and *7a* tightly together in sealing relationship. Control cranks 31 and 32 of shutter members 27 and 28 are actuated at the proper time by air cylinders 29 and 30.

Figure 10:
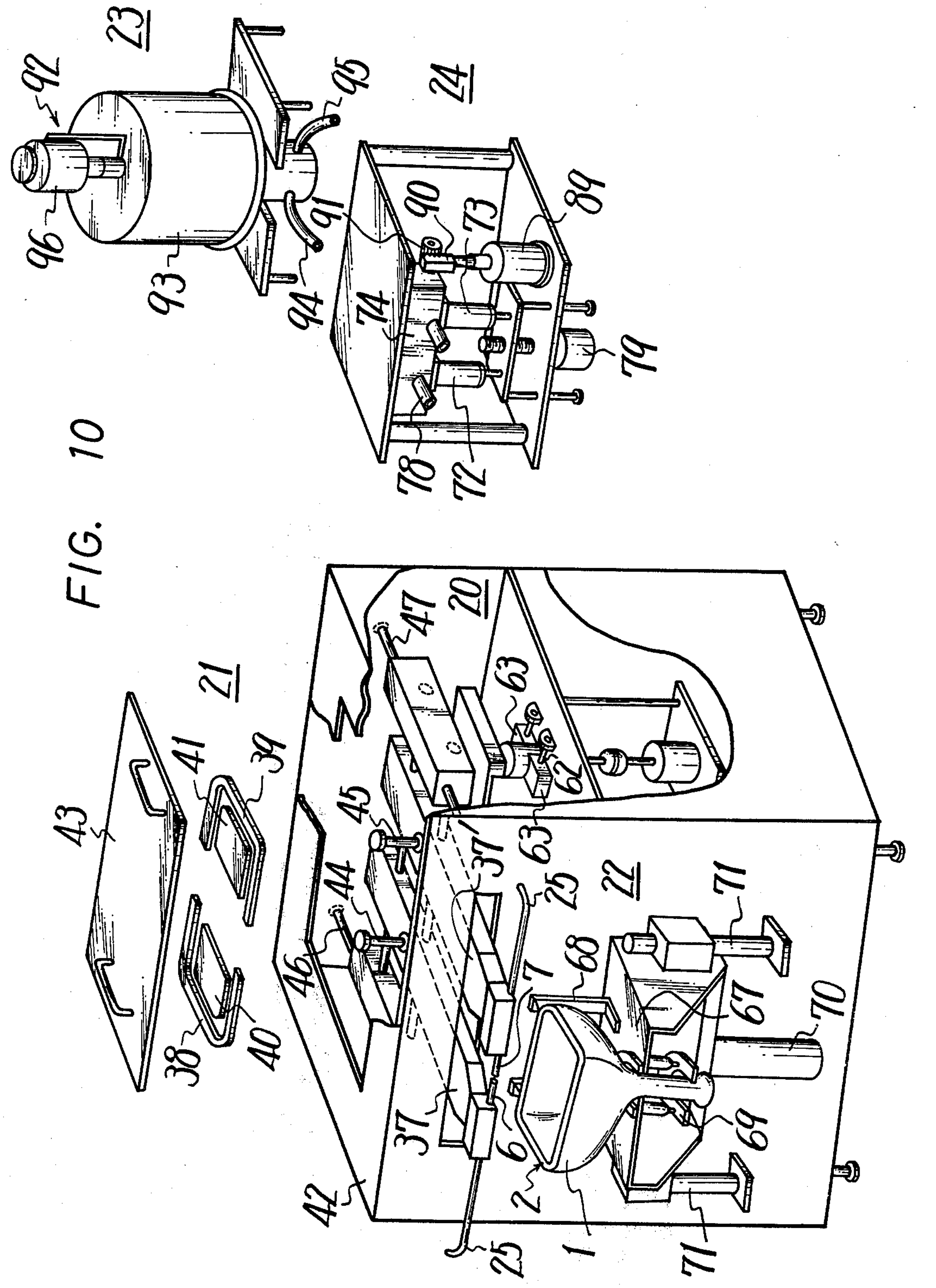
FIG. 10 is an exploded perspective view of an embodiment of the present invention in which certain portions are isolated and others are cut away for clarity of illustration.

Referring now to FIG. 10, there is shown a practical apparatus for performing the frit coating operation previously described. A drive device 20 moves nozzles 6 and 7 in opposite directions along the seal edge surface 2 of funnel portion 1 as previously described. A template member 21 provides guidance for the nozzles 6 and 7 during their travel. A different template 21 is required for each size and shape of funnel portion 1. A holding fixture 22 positions and holds funnel portion 1 in proper position with its seal edge surface 2 horizontal for the coating operation. A reservoir 23 contains a supply of frit slurry and delivers it via pipes 94 and 95 to a constant-rate pump 24. At the proper time in the cycle, pump 24 delivers frit slurry at a constant rate through conduits 25 to nozzles 6 and 7.

Attaching members 33 and 34 (FIG. 11) with their nozzles 6 and 7, as previously described, are attached to arms 37 and 37' of drive device 20. Follower shafts 44 and 45 rigidly affixed respectively to arms 37 and 37' engage guide grooves 38 and 39 in template halves 40 and 41 respectively of template 21. Template 21 thus restricts the movement of arms 37 and 37' such that nozzles 6 and 7 travel in alignment with the seal edge surface 2 of funnel portion 1. Template halves 40 and 41 are attached to an upper plate 43 of a housing 42. Upper plate 43 with its attached template 21 is removeable and replaceable by a corresponding member when it is desired to change the shape of the funnel portion 1 to be coated.

Figure 12:
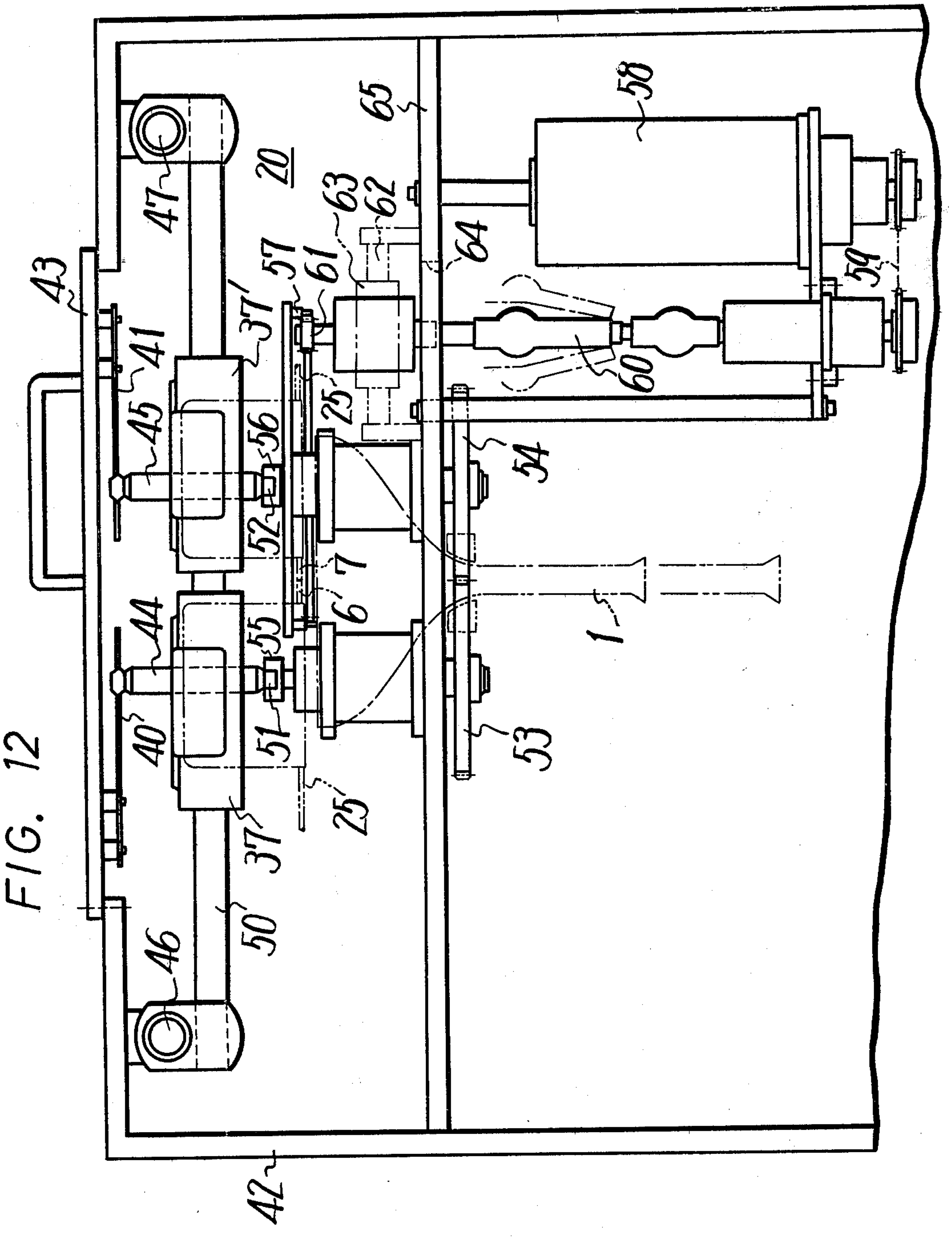
FIG. 12 is a front elevation of the apparatus of FIG. 10 showing internal members of the apparatus.
Figure 13:
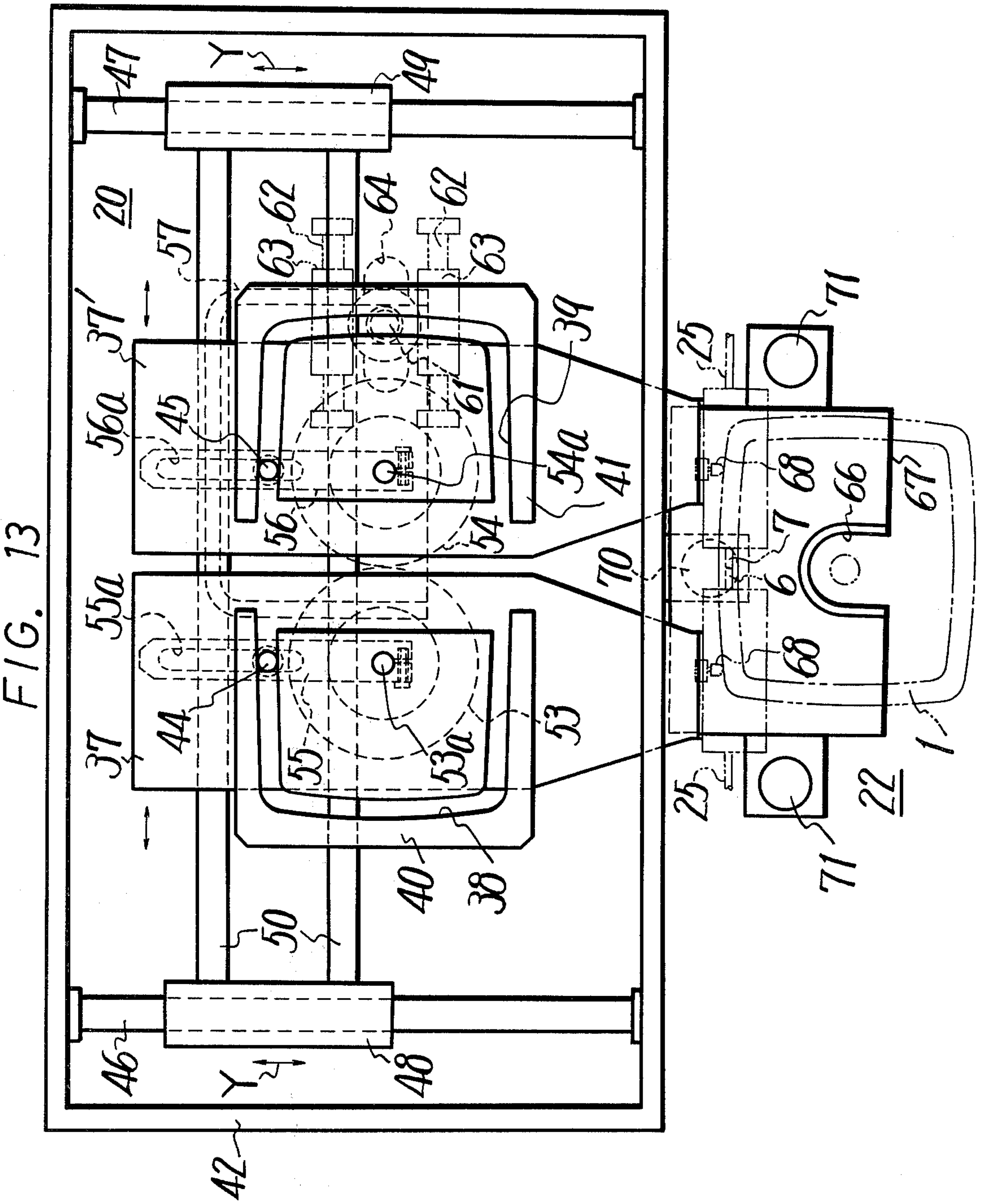
FIG. 13 is a plan view corresponding to FIGS. 10 and 12.

Referring now also to FIGS. 12 and 13, arms 37 and 37' are arranged to slide laterally, or in the X direction, on a pair of guide shafts 50. The ends of guide shafts 50 are affixed in sliding blocks 48 and 49. Sliding blocks 48 and 49 are arranged to slide in the fore and aft, or Y direction, on a pair of guide shafts 46 and 47 spanning the inside of housing 42. As is especially clear in FIG. 13, arms 37 and 38 are permitted to move laterally and in the fore and aft direction or any combination thereof by appropriate sliding of arms 37 and 38 on guide shafts 50 and of guide blocks 48 and 49 on guide shafts 46 and 47, respectively. An intermediate base plate 65 generally separates the housing 42 into an upper and lower space. Round gears 53 and 54 are rotatably mounted under intermediate base plate 65 with peripheral teeth of each round gear meshed with similar teeth of the other. Shafts *53a* and *54a* of round gears 53 and 54 rotate integrally with round gears 53 and 54 and have levers 55 and 56 rigidly associated therewith. Levers 55 and 56 have elongated slots along the axes thereof in which engagement portions 51 and 52 of follower shafts 44 and 45 are slideably engaged.

A rectangular gear 57 having a rectangular shape substantially similar to a half profile of seal edge surface 2 of funnel portion 1 is integrally rotated with shaft *54a*. A motor 58 in housing 42 rotates a universal joint 60 through a power transmission device of any suitable type such as a chain 59. An aperture 64 is provided in intermediate base plate 65 to permit the passage therethrough of a shaft of a pinion 61 and to permit its lateral motion as required to follow rectangular gear 57. Universal joint 60 rotates pinion 61 which is maintained in mesh with rectangular gear 57 by a moving member 63 which is capable of sliding laterally on a shaft 62. Pinion 61 rotates at a constant speed, and consequently the peripheral speed of rectangular gear 57 at the point of contact with pinion 61 is also substantially constant. As will be seen in the description which follows, this method of driving nozzles 6 and 7 results in a substantially constant speed of the nozzles with respect to seal edge surface 2 regardless the radius or shape about which they are moving. It will be noted that, if funnel portion 1 has a circular seal edge surface 2, rectangular gear 57 and template 21 are replaced with corresponding round members.

As best seen in FIG. 13, when pinion 61 is rotated by motor 58, rectangular gear 57, meshed with pinion 61, is rotated in the clockwise direction, as viewed from above in FIG. 13. Round gear 54 is rotated with rectangular gear 57. Round gear 53, being meshed with round gear 54 is also rotated, but in the counterclockwise direction. Levers 55 and 56 are rotated with round gears 53 and 54 respectively. Follower shafts 44 and 45 are thereby urged in opposite directions along guide grooves 38 and 39 of template halves 40 and 41 respectively. Arms 37 and 37' are thereby moved in symmetrically opposed motions which follow the seal edge surface 2 of funnel portion 1. Note that, as pinion 61 reaches a corner of rectangular gear 57, follower shafts 44 and 45 reach corners of their respective guide grooves 38 and 39. As will be clear to one skilled in the art, the angular velocity of round gears 53 and 54 is varied over the coating cycle of a rectangular seal edge surface 2 but the linear velocity of follower shafts 44 and 45 in guide grooves 38 and 39 and the linear velocity of nozzles 6 and 7 is approximately constant as required to permit laying down a uniform thickness frit coating stripe 5.

Referring now to FIGS. 10 and 13, holding fixture 22 has a funnel fixing base 67 having a cut out 66 for receiving the stem of funnel portion 1 and abutments 68 for rotationally positioning the funnel portion 1 and preventing it from rotating. A funnel clamp 69 actuated by air cylinders associated therewith is moveable to rigidly clamp funnel portion 1 in holding fixture 22. The entire holding fixture 22, including funnel portion 1 clamped therein, is moveable up and down on guide posts 71 by means of an air cylinder 70. The ability to move funnel portion 1 up and down in this fashion permits height adjustment of the apparatus to accommodate different sizes of tubes and permits easy installation and removal of funnel portion 1.

Reservoir 23 (FIG. 10) consists of a tank 93 for containing a supply of frit slurry and a stirring member 92 which employs a motor 96 external to tank 93 and stirring blades (not shown) inside tank 93 to maintain the slurry therein in a fully mixed condition.

Figure 15:
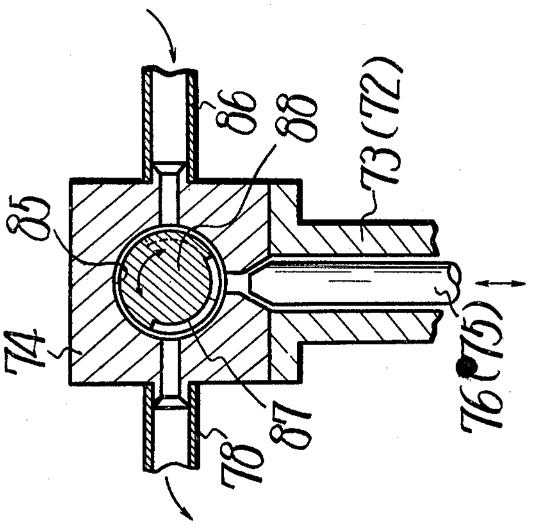
FIG. 15 is a cross-sectional view taken along XV—XV in FIG. 14.
Figure 14:
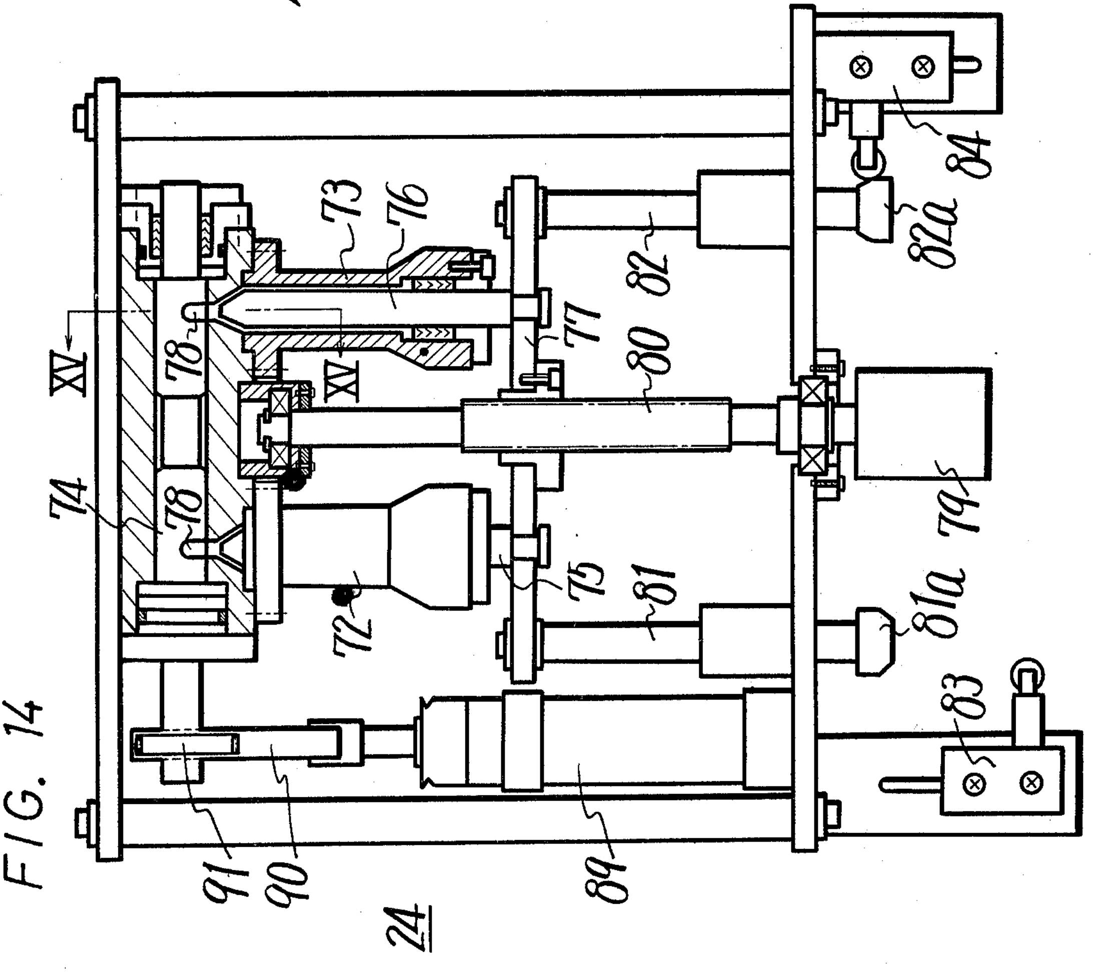
FIG. 14 is an enlarged view, partly in cross-section, of a constant rate pump of FIG. 10.

At appropriate times, frit slurry from tank 93 is fed through pipes 94 and 95 to a change-over valve 74 in constant-rate pump 24. Referring now also to FIGS. 14 and 15 in which the constant-rate pump 24 is shown in greater detail, first and second pump cylinders 72 and 73 are affixed at their upper ends to change-over valve 74. Displacement rods 75 and 76 are sealed and moveable in pump cylinders 72 and 73. The lower ends of displacement rods 75 and 76 are affixed to a support plate 77. Guide shafts 81 and 82 extending downward from support plate 77 are guided through bushings and terminate in enlargements 81a and 82a. Reversible motor 79, rotating a feed screw 80, raises and lowers displacement rods 75 and 76 as well as guide shafts 81 and 82. A lower limit switch 83 is actuated by the enlargement 81a on guide shaft 81 when displacement rods 75 and 76 are withdrawn to their outer most position. Limit switch 83 removes power from motor 79 and prevents further withdrawal of displacement rods 75 and 76. An upper limit switch 84 is actuated by enlargement 82a when displacement rods 75 and 76 are in their most advanced positions shown in FIG. 14 and prevents further insertion.

Change-over valve 74 (FIG. 15) has a bore 85 into which is tightly fitted a change-over valve member 88. Change-over valve member 88 has two communicating grooves 87 encircling a portion of its circumference aligned with pump cylinders 72 and 73 which selectively permit communication between pump cylinders 72 and 73 and either one of their associated inlet conduit 86 or exhaust conduit 78. In the position shown in solid line, communication groove 87 provides communication between pump cylinder 73 (or 72) and its associated exhaust conduit 78. In the position shown in dashed line, communication groove 87 permits communication between pump cylinder 73 (or 72) and its associated inlet conduit 86.

As best shown in FIGS. 10 and 14, change-over valve member 88 is rotated from its inlet-communicating position to its outlet-communicating position by an air cylinder 89 having a rack 90 affixed to the shaft thereof which engages and rotates a gear 91 integral with change-over valve member 88.

At the proper time in the cycle of the apparatus, namely when nozzles 6 and 7 are being returned to their starting positions and while awaiting the beginning of the next coating cycle, change-over valve member 88 is rotated to its dashed-line position and reversible motor 79 is rotated in the direction which withdraws displacement rods 75 and 76 from cylinders 72 and 73 respectively. The resulting reduced pressure in pump cylinders 72 and 73 draws a supply of frit slurry from tank 93 through pipes 94 and 95 and inlet conduit 86. This method of charging pump cylinders 72 and 73 avoids bubbles in the frit slurry. At the end of the outward, or downward, stroke of displacement rods 75 and 76, a fixed amount of frit slurry is charged into cylinders 72 and 73 respectively. The fixed amount of slurry can be adjusted by repositioning limit switch 83 upward or downward as permitted by the adjustment slot in the support member adjacent the upper end of limit switch 83.

Rotation of motor 79, producing upward travel of support plate 77 and displacement rods 75 and 76, is timed to begin in the vicinity of the initial motion of nozzles 6 and 7 and to continue thereafter at a constant rate thus displacing frit slurry from pump cylinders 72 and 73 at a constant rate. The frit slurry is discharged through exhaust conduits 78 and fed via conduits 25 to nozzles 6 and 7. At the end of the inward, or upward, stroke of displacements rods 75 and 76, limit switch 84, actuated by enlargement 82a deenergizes reversible motor 79 and terminates the delivery of frit slurry to nozzles 6 and 7. This is timed to occur approximately in coincidence with abutment of nozzles 6 and 7.

The following describes a cycle of operation of the apparatus.

A funnel portion 1 is placed in funnel fixing base 67 with the neck of funnel portion 1 extending through a cut out 66. The placement of the funnel portion 1 may be by manual means or by automatic equipment. Abutments 68 engage the sides of the funnel portion to roughly position it in the rotational and fore-and-aft direction. The apparatus is started by any convenient means such as by operation of a start button (not shown). Funnel clamp 69 firmly clamps funnel portion 1 in holding fixture 22. If necessary, air cylinder 70 may be operated to elevate holding fixture 22 and captured funnel portion 1 to adjust the spacing between nozzles 6 and 7 and seal edge surface 2. Air cylinder 89 (FIGS. 10 and 14) is operated to change change-over valve 74 (FIG. 15) from its intake position shown in dashed line to its discharge position shown in solid line. Reversible motor 79 (FIGS. 10 and 14) is started and the upward motion of displacement rods 75 and 76 elevates the pressure of frit slurry at nozzles 6 and 7. As the pressure of frit slurry at nozzles 6 and 7 is raised, arms 37 and 37' begin moving apart whereby nozzles 6 and 7 begin tracing seal edge surface 2 and discharging a constant quantity of frit slurry upon seal edge surface 2. As previously explained one shutter member 28 closes nozzle 7 to stop feeding frit slurry from nozzle 7 prior to abutment of nozzles 6 and 7 at the end of coating. As nozzles 6 and 7 come together, shutter member 27 is operated and constant rate pump 24 is stopped to terminate the flow of frit slurry from nozzle 6. Following the completion of coating, funnel portion 1 may be returned to its lower position and funnel clamp 69 released to permit removal of funnel portion 1 and replacement with a new funnel portion 1 to be coated. Arms 37 and 37' are returned to their original position and constant rate pump 24 draws a new supply of frit slurry from tank 93 in preparation for the next cycle.

Although actuation of elements of the apparatus has been described using air cylinders, other suitable actuating means such as solenoid actuators, screw-type linear actuators or hydraulic actuators may be substituted therefor without departing from the scope of the invention.

Having described a specific embodiment of the invention with reference to the accompanying drawings, it is to be understood that the invention is not limited to this precise embodiment and that various changes and modifications may be effected therein by one skilled in the art without departing from the scope or spirit of the invention as defined in the appended claims.

What is claimed is:

1. A method of applying a closed pattern of material to a substantially horizontal, upwardly facing, surface comprising the steps of: disposing at least first and second nozzles having outlets spaced above a first point on said surface, said outlet of said first nozzle and said outlet of said second nozzle being abuttingly opposed to each other and mutually blocking at said first point; simultaneously moving said first and second nozzles in opposite directions along a path corresponding to said closed pattern with said first and second nozzles starting from said first point and moving to terminal points keeping said nozzles aimed in fixed directions relative to said surface; supplying said material at a constant rate to said first and second nozzles during said moving wherefrom said material is deposited in a continuous stripe onto said surface; and substantially simultaneously halting the movement of said first and second nozzles at said terminal points whereat said outlet of at least said first nozzle is abuttingly opposed to and mutually blocking an adjacent nozzle outlet whereby said surface is coated with a closed continuous, substantially uniform pattern of said material.

2. The method according to claim 1; which includes the step of halting discharge of said viscous material from said first nozzle before the latter attains the respective one of said terminal points.

3. An apparatus for applying a closed pattern of viscous material on a surface of an article comprising: support means for supporting said article in a fixed position; at least first and second nozzles having first and second outlets respectively for discharging said viscous material; means for mounting said first and second nozzles in respect to said support means and for simultaneously moving said first and second nozzles in opposite directions along respective paths parallel to respective portions of said closed pattern extending from respective initial points to respective terminal points; said first and second outlets being spaced above said surface for applying thereto said viscous material discharged through said first and second outlets; said first and second nozzles being abuttingly coincident with each other and mutually blocking the outlets thereof in said initial points, and each outlet of said first and second nozzles, when at said terminal point thereof, being abuttingly coincident with and mutually blocking an outlet of another of said nozzles; means for supplying said viscous material to each of said nozzles during movement thereof between the respective initial point and terminal point whereby said closed pattern of viscous material is deposited on said surface.

4. The apparatus according to claim 3; in which at least one of said first and second nozzles includes means for stopping the discharge of said viscous material therefrom before said one nozzle attains the respective terminal point.

5. Apparatus for coating a closed pattern of material on a horizontal surface comprising: first and second nozzles having parallel horizontal axes spaced above said horizontal surface; said first and second nozzles respectively having first and second nozzle outlets; means for moving said first and second nozzles in opposite directions along said closed pattern from a first position whereat said first and second nozzle outlets are abuttingly opposed and mutually blocking to a second position whereat said first and second nozzle outlets are abuttingly opposed and mutually blocking; means for supplying a flow of said material at a constant rate to said first and second nozzles during motion thereof between said first and second positions; and terminating means for terminating said flow at said second position.

6. The apparatus according to claim 5; wherein said terminating means includes abutment and mutual blocking of said first and second nozzle outlets at said second position.

7. The apparatus according to claim 5; wherein said terminating means includes shutter means for blocking at least one of said first and second nozzles.

8. The apparatus according to claim 7; wherein said shutter means includes first shutter means for blocking said first nozzle and second shutter means for blocking said second nozzle.

9. The apparatus according to claim 8; wherein said first shutter means is operative to block said first nozzle before said first and second nozzles reach said second position.

10. The apparatus according to claim 5; wherein said means for moving includes spring means for biasing said first and second nozzle outlets into abutting relationship.

11. The apparatus according to claim 8; wherein said terminating means includes a control system, said control system including first means for actuating said first shutter means and second means for actuating said second shutter means, said second means for actuating including means for delaying actuation of said second shutter means until after said first shutter means is actuated.

12. The apparatus according to claim 5; wherein said means for moving includes a template, said template having at least one guide groove therein defining at least part of said closed pattern, follower means for following said at least one guide groove and for defining at least part of said closed pattern for at least one of said first and second nozzles.

13. The apparatus according to claim 12; wherein said template is replaceable to permit changing said closed pattern.

14. The apparatus according to claim 12; wherein said means for moving further includes drive means for moving said first and second nozzles at a substantially constant speed along said closed pattern regardless the shape and size of said closed pattern.

15. The apparatus according to claim 14; wherein said drive means includes a motor and a pinion, a gear meshed with said pinion, said gear having a shape substantially similar to a shape of at least part of said closed pattern, a first round gear coaxial with and integrally rotated with said gear, a second round gear meshed with said first round gear, a first lever integrally rotated with said first round gear, a second lever integrally rotated with said second round gear, said follower means including first follower means defining a first part of said closed pattern for said first nozzle and second follower means defining a second part of said closed pattern for said second nozzle, first engagement means on said first follower means for engaging said first lever and second engagement means on said second follower means for engaging said second lever.

16. The apparatus according to claim 5; wherein said horizontal surface includes a seal edge surface of a funnel portion of a cathode ray tube and said apparatus further comprises holding means for holding said funnel portion.

17. The apparatus according to claim 16; wherein said holding means includes a funnel fixing base for receiving said funnel portion, abutment means for positioning said funnel portion in said holding means and funnel clamp means for clamping said funnel portion in said holding means.

18. The apparatus according to claim 17; wherein said holding means includes means for raising and lowering said funnel portion with respect to said first and second nozzles.

19. Apparatus for coating a closed pattern of viscous slurry on a horizontal surface comprising: first and second nozzles having outlets spaced above said horizontal surface; means for providing said viscous slurry to said first and second nozzles at a constant rate; means for moving said first and second nozzles in opposite directions at a constant speed along said closed pattern from a first point to a second point, whereby a path followed by each of said first and second nozzles defines half of said closed pattern; and said means for moving being operative to dispose said outlets of said first and second nozzles in abutting and mutually blocking relationship at said first and second points.

20. The apparatus according to claim 19; wherein said first and second nozzles have first and second horizontal axes respectively and said first and second horizontal axes are parallel to each other.

21. The apparatus according to claim 19; further comprising means for blocking said first and second nozzles at least at said second point.

22. The apparatus according to claim 21; wherein said means for blocking includes at least one shutter means for blocking at least said first nozzle.

23. The apparatus according to claim 22; wherein said at least one shutter means includes first shutter means for blocking said first nozzle and second shutter means for blocking said second nozzle.

24. The apparatus according to claim 23; further comprising control means for actuating said first shutter means before actuating said second shutter means.

25. The apparatus according to claim 19; wherein said means for moving includes a template, said template having at least one guide groove therein defining at least part of said closed pattern, follower means for following said at least one guide groove and for defining at least part of said closed pattern for said first and second nozzles.

26. The apparatus according to claim 25; wherein said template is replaceable to permit changing said closed pattern.

27. Apparatus for coating a closed pattern of frit slurry on a seal edge surface of a funnel portion of a cathode ray tube comprising: means for holding said seal edge surface in a horizontal position; first and second nozzles having outlets spaced above said seal edge surface and having parallel horizontal axes; means for moving said first and second nozzles in opposite directions at equal constant speeds along said seal edge surface from a first position wherein said outlets of said first and second nozzles open toward each other in abutting and mutually blocking relation to a second position wherein said outlets of said first and second nozzles again open toward each other in abutting and mutually blocking relation; and frit slurry supplying means for supplying frit slurry at a constant rate to said first and second nozzles at least during part of their travel from said first position to said second position.

* * * * *